United States Patent [19]

Pitts

[11] 4,201,750

[45] May 6, 1980

[54] PROCESSING OF BREUNNERITE TO RECOVER MAGNESIUM COMPOUNDS

[75] Inventor: Frank Pitts, Magalas, France

[73] Assignee: Engelhard Minerals & Chemicals Corporation, Edison, N.J.

[21] Appl. No.: 899,168

[22] Filed: Apr. 24, 1978

[51] Int. Cl.$^2$ ............................ C01F 5/30; C01F 5/38; C01F 5/40
[52] U.S. Cl. .................................... 423/162; 423/163; 423/166; 423/175; 423/177
[58] Field of Search ............... 423/155, 166, 173, 175, 423/177, 162, 163

[56] References Cited

U.S. PATENT DOCUMENTS

| | | | |
|---|---|---|---|
| 1,964,747 | 7/1934 | Sweet et al. | 423/173 |
| 2,345,655 | 4/1944 | Brandenburg | 423/173 |

*Primary Examiner*—Delbert E. Gantz
*Assistant Examiner*—Wayne A. Langel
*Attorney, Agent, or Firm*—Inez L. Moselle

[57] ABSTRACT

A process for the preparation of magnesium compounds from breunnerite or from mineral concentrates or tailings containing breunnerite in which the mineral is calcined and treated with an acid and the magnesium salt solution so formed is separated from insoluble matter.

9 Claims, No Drawings

PROCESSING OF BREUNNERITE TO RECOVER MAGNESIUM COMPOUNDS

BACKGROUND

In crystalline deposits of the mineral magnesite, the $MgCO_3$ is frequently replaced in part by ferrous carbonate. When this constituent exceeds about 5%, the mineral is termed breunnerite. Typically, such deposits contain about 6 to 9% FeO and although they are often mined for use in making refractories, they are unsuitable for manufacture of commercially pure magnesium compounds such as magnesium sulphate and magnesium chloride.

Breunnerite also occurs in association with other minerals, for example, in talcs of which the breunnerite content may contain as much as 12% FeO and may be associated with other minerals such as pyrrhotite, gersdorffite, pyrite, cobaltite and smalite. In the beneficiation of such minerals to recover talc, tailings are produced which are principally breunnerite associated with varying proportions of these associated minerals. The magnesium carbonate content of these tailings may be 60 to 80%, but because of the many impurities contained, the tailings have not hereto found any commercial use either for refractory manufacture or as a raw material for the manufacture of magnesium compounds.

It is an objective of the present invention to provide a simple process for the recovery of commercially pure magnesium compounds from breunnerite or from tailings of concentrates containing breunnerite.

THE INVENTION

Briefly, the essence of the present invention resides in heating breunnerite or a material containing breunnerite to expel the greater part of the carbon dioxide and thereafter causing the calcined material to react with an acid under such conditions that the magnesium contained initially in the breunnerite is covered into a water soluble magnesium salt of the acid while the impurities such as iron, nickel, cobalt, aluminum and arsenic remain in the water insoluble solids which are separated by any conventional liquid-solids separation process to provide a substantially pure solution of a magnesium salt.

The use of impure materials containing magnesium oxide or carbonate, such as tailings from talc beneficiation as neutralizing agents in the processing of impure vanadiferous acid sulphate solutions to recover vanadium therefrom is mentioned in my copending application, Ser. No. 842,734, filed Oct. 17, 1977.

In processing brennerite containing materials which contain chromium by the process of this invention, the magnesium salt solution produced may contain chromate ions. If the magensium salt is recovered in the solid form, for example, by crystallization of the solution, the solid salt may be contaminated by chromium. It is another objective of the present invention to prevent this contamination of the recovered solid magnesium salts by acidifying the magnesium salt solution obtained after separation of the water insoluble impurities and prior to recovery of the solid salts from the solution.

A preferred embodiment of the invention comprises a process for the preparation of substantially pure magnesium salts from materials containing breunnerite which comprises the steps of heating the breunnerite containing material to expel most of the carbon dioxide contained in it, causing the calcined material thus obtained to react with an acid in an amount such that the final pH of the reaction mass lies between 5 and 8, separating insoluble material from the magnesium salt solution by conventional means, optionally after first reducing the pH of the solution to a value less than 4.5.

In an especially important aspect of this embodiment of the invention, tailings from the mineral beneficiation of talc which contain breunnerite are calcined and the calcined product is caused to react in the presence of water with sulphuric acid, hydrochloric acid or nitric acid, the proportions of tailings and acid employed being such that the pH on completion of the reaction is at least 5 and not more than 8. Insoluble material is removed by filtration and the pH of the filtrate is adjusted to a value of less than 4.5 by addition of a sufficient quantity of acid and the magnesium salt is crystallized from the solution by conventional means. The mother liquor from the crystallization is recycled in the process. If the material containing breunnerite is treated directly with acid, that is to say, without calcining it, very little of the magnesium content is dissolved unless a large excess of acid is used such that the final pH is much lower than 1. Under these conditions, many of the impurities such as iron, cobalt and arsenic also dissolve; a pure magnesium compound cannot be obtained by simple processing, such as by crystallization, from the impure solution of magnesium salt thus obtained.

PREFERRED EMBODIMENTS

In processing minerals containing talc to recover talc in saleable form such as, for example, by screening, gravity tabling, froth flotation or magnetic separation or by combinations of these mineral beneficiation techniques, tailings arise which are composed of talc, breunnerite, pyrrhotite, gersdorffite, pyrite, cobaltite and smalite. These tailings are dried and calcined at a temperature in the range 1000° F. to 1800° F., preferably 1100° to 1300° F. The calcined product is slurried with water and to the stirred slurry is gradually added sulphuric acid until the pH has decreased to about 6.5. The solution is filtered and the filter cake is washed with water. To the combined filtrate and washings more sulphuric acid is added to reduce to pH to 4 and the solution is evaporated until it contains about 30% by weight $MgSO_4$ and it is then cooled to about 30° C. to cause magnesium sulphate heptahydrate (Epsom salt) to crystallize. The crystals are separated by centrifuging the slurry and are washed with water and dried to produce Epsom salt for sale. The mother liquor and washings are used in place of water to form a slurry with a further quantity of calcined tailings.

If the amount of water used is such that the concentration of magnesium sulphate (as $MgSO_4$) formed in the reaction is about 30% and the reaction is carried out at a temperature of 70° C. or higher, the step of evaporating the solution can be omitted and the Epsom salt can be recovered simply by cooling the solution to effect crystallization.

If it is desired to produce magnesium chloride hexahydrate instead of Epsom salt, the tailings are reacted with hydrochloric acid instead of sulphuric acid and the pH is finally adjusted to pH 4 with hydrocholoric acid. The solution of magnesium chloride thus produced is evaporated until hexahydrate begins to crystallize when it is cooled to complete the crystallization and the hexahydrate crystals are separated by centrifuging and washing with water. Alternatively, the solution may be evaporated until its composition corresponds with the composition of MgCl₂6H₂O and it may then be allowed to cool to produce the commercial form known as "solid fused" magnesium chloride hexahydrate.

By using nitric acid for the reaction, a solution of magnesium nitrate is obtained from which may be crystallized magnesium nitrate hexahydrate.

The following example is given for illustrative purposes and is not considered to be limiting the invention to the specific material and procedures described therein. The example describes the preparation from talc tailings of Epsom salt.

Tailings from the mineral beneficiation of talc when dried had the following composition:

| | |
|---|---|
| MgO | 38.8% |
| Fe$_2$O$_3$ | 9.7% |
| SiO$_2$ | 8.4% |
| Al$_2$O$_3$ | 1.7% |
| CaO | 1.1% |
| Ni | 0.2% |
| As | 0.6% |
| Loss on ignition at 1800° F. | 41.5% |

On calcining a sample of these dried tailings for two hours at a temperature of 1100° F., the material lost 35.4% of its weight.

Three hundred (300) grams of these calcined tailings were mixed with 600 ml. of water. The pH of the slurry was found to be 9.6. While stirring the slurry, sulphuric acid was gradually added as a solution containing 500 grams per liter H$_2$SO$_4$ at such a rate that the pH did not, except monentarily, fall below 6.5. The addition was continued until the pH no longer rose above 7 when the slurry was stirred without further addition of acid for 30 minutes. During the addition of acid the temperature of the slurry gradually increased from 22° C. to 70° C. The amount of H$_2$SO$_4$ (500 grams per liter) added was 550 ml. The slurry was then filtered and the filter cake was washed with 450 ml. of water at 70° C. The volume of the combined filtrate and washings was 1076 ml. (weight 1342 g.) and was found to contain about 22% by weight MgSO$_4$, three parts per million Ni, less than 1 p.p.m. As and 70 p.p.m. Cr. The solution was of a yellow color. The pH of the solution was reduced to 4.0 by dropwise addition of 500 g.p.l. sulphuric acid; 1.2 ml. of acid was required. The solution was evaporated until the weight was reduced to 1100 g. The solution was allowed to cool to crystallize magnesium sulphate heptahydrate which was separated by filtration, washed with water and dried. The weight of Epsom salt recovered was 229 grams. On analysis it was found to contain 99.5% MgSO$_4$7H$_2$O, less than 1 ppm arsenic and less than 10 ppm of heavy metals as defined in the U.S. Pharmacopoeia.

I claim:

1. A process for the preparation of magnesium compounds from breunnerite or from materials containing breunnerite which comprises the steps of drying and calcining the breunnerite to expel the greater part of the carbon dioxide contained in it, causing the calcined product to react in presence of water with an acid selected from the group consisting of sulphuric acid, hydrochloric acid and nitric acid, the calcined material and the acid being used in such proportions that the pH of the reaction mass on completion of reaction has a value between 6 and 7, separating the insoluble material from the solution of the magnesium salt of the aforesaid acid and recovering said magnesium salt.

2. The process of claim 1 in which the material containing breunnerite consists of tailings from the mineral beneficiation of talc.

3. The process of claim 2 in which the tailings are dried and calcined at a temperature between 1000° F. and 1800° F.

4. The process of claim 3 in which the temperature is between 1050° F. and 1400° F.

5. The process of claim 1 in which the magnesium salt is recovered from the solution by crystallization.

6. The process of claim 5 wherein chromium is present with magnesium in said breunnerite or material containing breunnerite and the solution from which said insoluble material is separated contains chromium and magnesium salts, including the step of reducing the pH of said solution containing chromium and magnesium salts to a value less than 4.5 before recovering the magnesium salt by said crystallization.

7. The process of claim 1 in which the acid is sulphuric acid and the magnesium salt is hydrated magnesium sulphate.

8. The process of claim 1 in which the acid is hydrochloric acid and the magnesium salt is hydrated magnesium chloride.

9. The process of claim 1 in which the acid is nitric acid and the magnesium salt is hydrated magnesium nitrate.

* * * * *